United States Patent [19]

Becker et al.

[11] 4,299,248
[45] Nov. 10, 1981

[54] DIAPHRAGM VALVE AIR VENT DEVICE FOR WATER SYSTEMS

[75] Inventors: Bernard B. Becker, Belmont; John K. Bowman, Brighton; Joseph A. Lane, Taunton, all of Mass.

[73] Assignee: Amtrol Inc., West Warwick, R.I.

[21] Appl. No.: 20,087

[22] Filed: Mar. 13, 1979

[51] Int. Cl.³ ............................................. F16K 31/34
[52] U.S. Cl. .................................... 137/202; 137/414
[58] Field of Search ...................... 137/202, 195, 414

[56] References Cited
U.S. PATENT DOCUMENTS

| | | | |
|---|---|---|---|
| 2,849,016 | 8/1958 | Nations | 137/202 |
| 3,319,913 | 5/1967 | Schoepe . | |
| 3,428,966 | 2/1969 | Schoepe . | |
| 3,429,333 | 2/1969 | Schoepe . | |
| 3,495,803 | 4/1970 | Schoepe | 137/414 X |
| 3,576,199 | 4/1971 | Schoepe . | |
| 3,624,893 | 12/1971 | Schoepe . | |
| 3,626,574 | 12/1971 | Schoepe . | |

FOREIGN PATENT DOCUMENTS 1205253 11/1965 Fed. Rep. of Germany ...... 137/202

*Primary Examiner*—Alan Cohan
*Attorney, Agent, or Firm*—Fisher, Christen & Sabol

[57] ABSTRACT

An air vent device for automatically venting entrapped air from hot water heating and chilled water cooling systems. The device can vent a large volume of air in a relatively short time by using a large vent opening, controlled by a pilot valve operated diaphragm venting valve. The pilot valve, actuated by a spring and connected to a float, permits air pressure within the device to pass to the rear of the diaphragm valve to maintain it in a closed position during normal operation of the system. When the float drops to a predetermined position the float weight overcomes the spring force and the pilot valve vents the rear side of the diaphragm valve to atmosphere, allowing it to open, thereby venting the air collected in the device to atmosphere.

9 Claims, 5 Drawing Figures

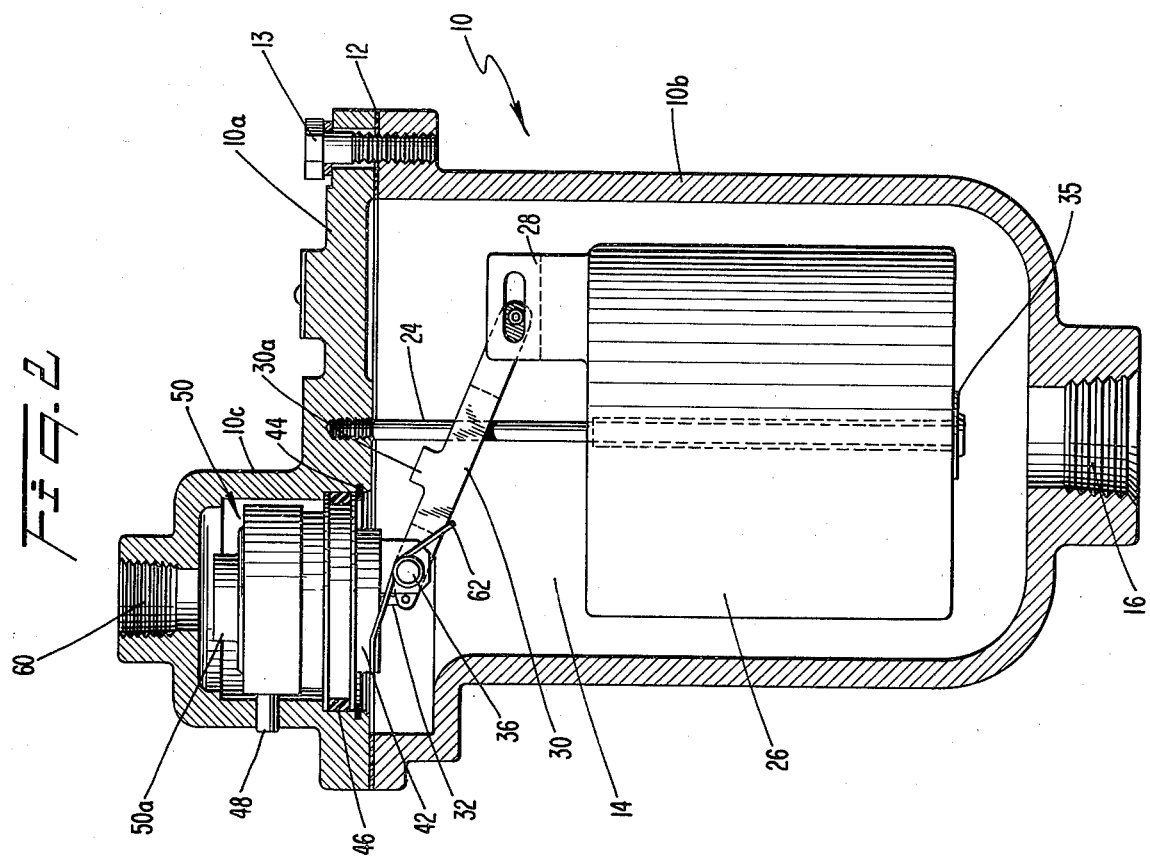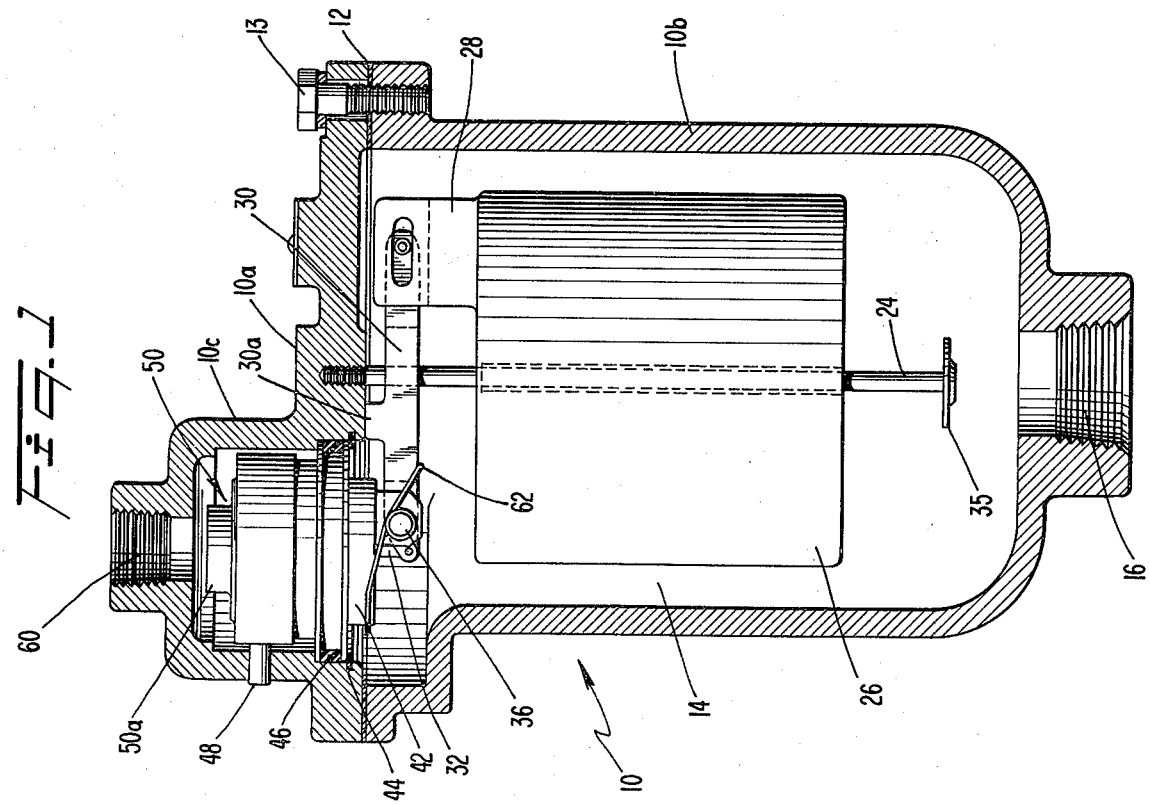

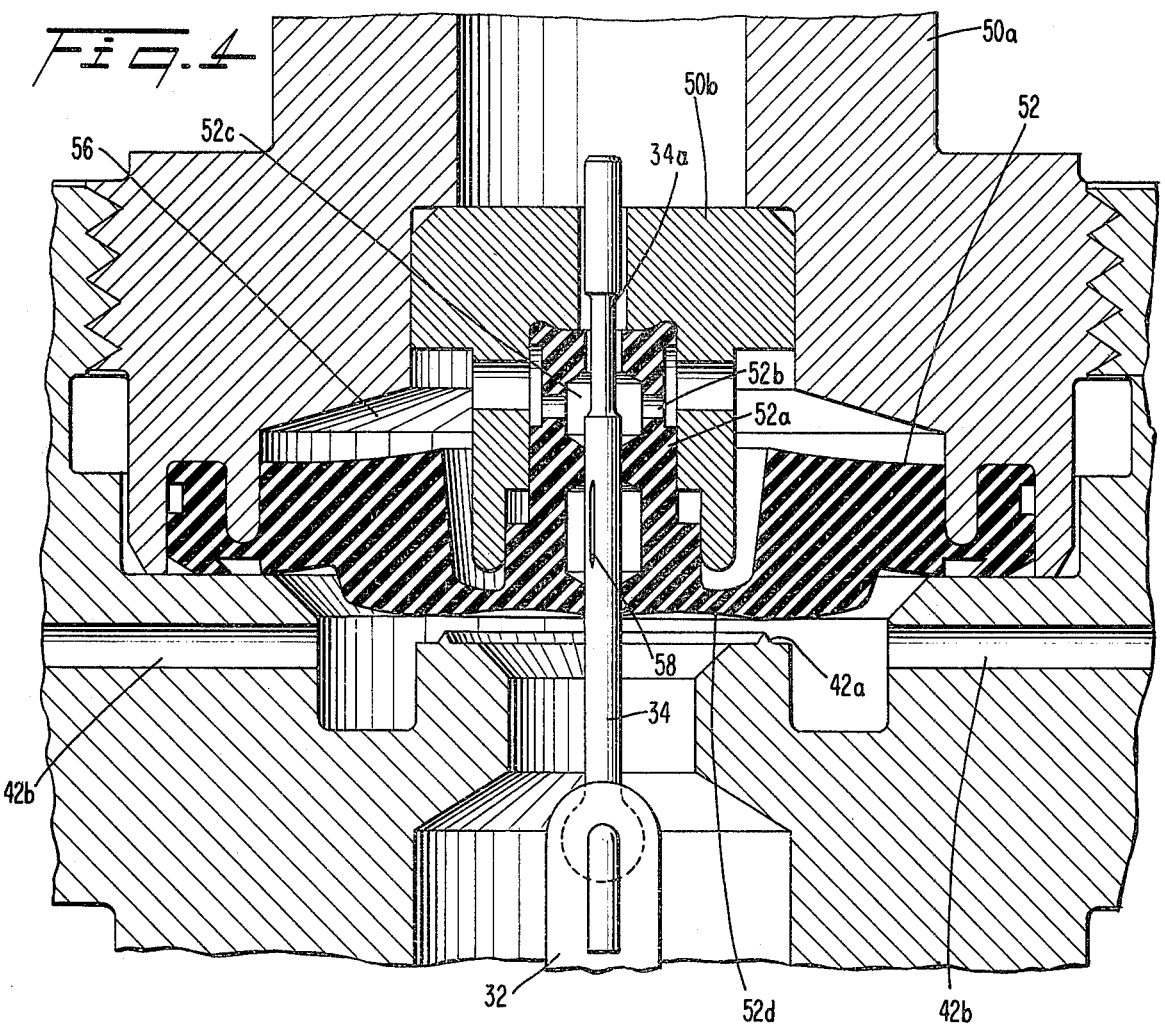
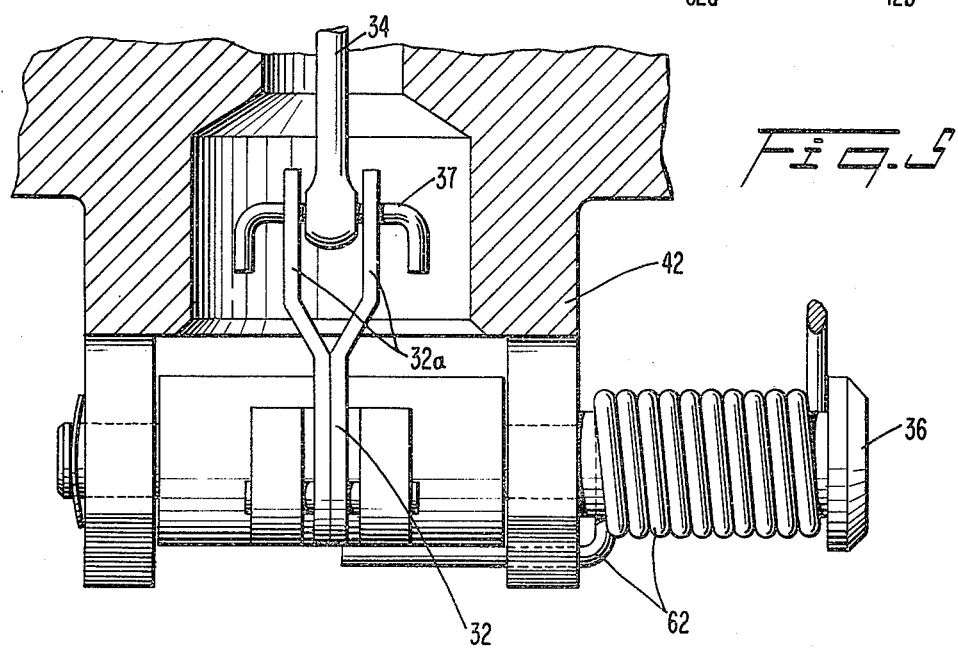

DIAPHRAGM VALVE AIR VENT DEVICE FOR WATER SYSTEMS

FIELD OF THE INVENTION

This invention relates to air venting devices utilized to eliminate free air and/or gas bubbles that are present in liquid-filled piping systems used for hot water heating, chilled water cooling, and potable water distribution.

BRIEF DESCRIPTION OF PRIOR ART

In a liquid filled piping system, air or gas is released from a state of solution in the liquid through the effect of temperature and pressure changes as the system operates. It is therefore necessary to provide a means for venting and purging the air and/or gas bubbles to prevent air blockage, thermal locks, corrosion, and noise. This air in the form of bubbles, tends to collect in high points in the piping and system components causing blocked circulation, inefficient system operation, and pump cavitation. This condition poses a critical problem in large apartment and industrial type heating/cooling systems which involve relatively large liquid and air volumes with high water pressure heads.

The air vent structure currently in use and popularly known as the automatic float-type vent consists of a pressure chamber containing a swing type check valve, which is connected by a mechanical linkage to a float. As water and air from the piping system enters the chamber, the float raises to a predetermined level where it closes the check valve. The air bubbles collect in the top of the vent chamber and displace the water. When the water level drops to a predetermined level float weight causes the check valve to open, venting the air from the chamber.

The air vents are placed in the piping system, singly or in conjunction with an air separating device in those locations where free air bubbles would be normally expected to collect.

Theoretically, this device serves the purpose of venting air. However, in actuality, it is limited to removing small amounts of air from the system and suffers serious drawbacks which prevent it from reliably achieving its purpose in large volume heating systems with high water pressure heads. For example, the check valve vent area has to be relatively small, so that the float can open it when there is high pressure in the float chamber developed by system water pressure head and expansion conditions.

The air pressure acting within the pressure chamber to force the water downwardly also acts against the check valve tending to prevent it from opening. As the air pressure increases, the force required to open the check valve also increases. To insure the reliability of these prior art devices, either the force generated by the downward travel of the float was increased, or the area of the check valve was decreased to reduce the requisite opening force. The weight of the float could not be increased to any great degree due to the limited vent size. The only rational way to insure that the check valve would open was to minimize the area of the check valve itself. However, a small check valve cannot vent large quantities of air quickly. Thus, the prior art devices have involved a compromise between two desirable features, namely, reliable operation and quick venting. Quick venting not only is desirable after the system is in operation, but it enables the system to be initially filled with water quicker. Furthermore, the small vent port area also results in entrained foreign matter clogging the opening, thus making the vent impractical for the initial purging of the system.

The limited venting capacity of the prior art devices have often necessitated the use of several of them at one location to effectively remove the required amount of air from the system. This is obviously an inadequate solution to the problem since it increases costs to the user both in the initial installation and for maintenance. Maintenance costs are also increased by the use of the relatively small vent orifice since their size makes them susceptible to malfunction caused by detritus, corrosion or foriegn material which is generally present in the water system.

SUMMARY OF THE INVENTION

The present invention obviates the deleterious features of the aforementioned prior art devices by providing a venting device with a relatively large vent orifice, but at the same time having reliable operation. This is achieved by utilizing a pilot valve actuated diaphragm venting valve in place of the check valve of the prior art devices.

The pilot valve and diaphragm venting valve structure are such that the air pressure within the housing acts on the front and rear sides of the diaphragm, however, the diaphragm valve is maintained in a closed position due to the larger effective area on the rear side, i.e., the side facing away from the housing. When the air volume builds up and lowers the water level within the housing, a float, mechanically connected to the pilot valve, causes the spring biased pilot valve to change its position and vent the rear side of the diaphragm to the atmosphere. The pressure acting on the front of the diaphragm then forces it open to also vent the air in the housing to the atmosphere. As the water level rises, the return spring and the float bring the pilot valve back to its original position where it closes the pilot vent, which then directs system air pressure to the rear side of the diaphragm. Due to the larger effective area, the air pressure closes the diaphragm venting valve.

The pilot operated diaphragm venting valve enables the use of a larger venting orifice than the prior art devices, while at the same time there are no unduly high forces acting on the valve which will inhibit its operation.

It is an objective of the present invention to provide an air vent having much greater venting capacity without appreciably increasing the overall physical size of the float and chamber or the manufacturing costs.

It is a further objective to provide an air vent having increased venting capacity with a single vent orifice.

It is an additional objective to provide a vent valve with improved reliability.

It is a further objective to provide an air vent valve structure with more positive sealing and one whose operation is relatively insensitive to detritus, corrosion or foreign material.

Another object is to overcome the disadvantage of low actuating forces and limited valve seating forces, as found in prior art devices due to direct actuation of the venting valve by the float.

BRIEF DESCRIPTION OF THE DRAWINGS

FIG. 1 is a cross-sectional view of the air vent device according to the invention with the diaphragm venting valve in a closed position.

FIG. 2 is a cross-sectional view of the air vent device of FIG. 1 with the diaphragm venting valve in an open position.

FIG. 4 is an enlarged cross-sectional view of the valve of FIG. 3 showing the valve in an open position.

FIG. 5 is an enlarged cross-sectional view of the attachment of the pilot valve pin of the device of FIG. 1.

DETAILED DESCRIPTION OF THE PREFERRED EMBODIMENT

Figure 3:
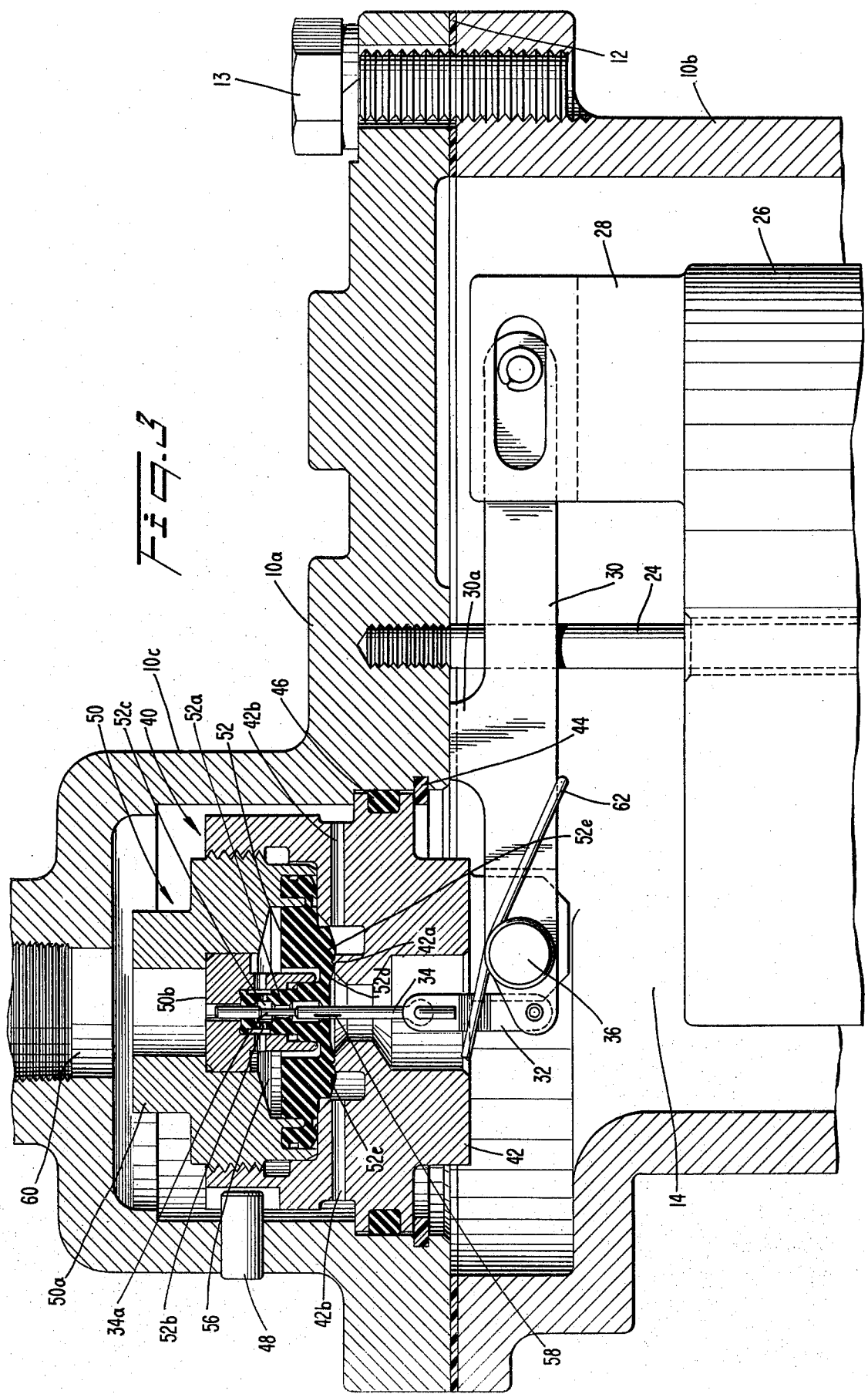
FIG. 3 is an enlarged cross-sectional view of the diaphragm venting valve of the device of FIG. 1 showing the valve in a closed position.

The air vent device according to the present invention is shown in cross-section in FIG. 1 and comprises housing 10 having upper and lower portions 10a and 10b joined together along separation line 12 by bolts, screws, or the like indicated at 13. The interior of lower housing 10b defines pressure chamber 14, which communicates with the hot water heating or chilled water cooling system (not shown) through opening 16 through the wall of lower housing 10b. Standard pipe connecting means may be utilized to connect opening 16 to the water system. Float guide rod 24 is threadingly attached to upper housing portion 10a and slidably passes through float 26 to guide the path of travel of the float. Obviously, any other method of attaching float guide rod 24 to portion 10a may be used without exceeding the scope of this invention. Float guide rod 24 extends through a central opening in float 26 such that the float may move vertically with respect to the guide rod. Float 26 may be a hollow metallic structure, or it may be made of plastic or any other material which will float on water and not be affected by the temperatures of the water used in the system. Tab 28 is attached to float 26 such that it enters therefrom and is pivotally attached to one end of link 30. Link 30 is also pivotally connected to valve seat structure 42, to be described hereinafter, at pivot point 36 and to link 32 at its opposite end. Link 32, in turn, is pivotally connected to pivot valve pin 34 as shown in detail in FIG. 5. Link 32 has expanded "U" portion 32a which extends on both sides of pilot valve pin 34 with rod 37 extending through both "U" portions and pilot valve pin 34. Obviously other means of pivotally connecting link 32 with pilot valve pin 34 may be utilized without exceeding the scope of the invention. Link 30 has stop portion 30a extending from one side which contacts upper housing portion 10a to provide an upper limit on float travel and consequently, a limit on the closing of the pilot valve, as shown in FIG. 3. The lower float position is governed by stop 35 attached to the lower position of the float guide rod 24.

The diaphragm valve structure is shown in detail in FIGS. 3 and 4. Upper housing 10a has raised portion 10c defining a cavity into which diaphragm venting valve structure 40 is placed. Diaphragm venting valve structure 40 comprises valve seat structure 42 sealingly retained in position within the cavity via snap ring 44, "O" ring seal 46, and dowel 48 inserted through the wall of upper housing portion 10a. Retainer 50, comprising elements 50a and 50b, threadingly engages valve seat structure 42 and serves to retain diaphragm valve 52 in position as shown with sealing portion 52e of diaphragm 52 in sealing contact with annular valve seat 42a. The requirement for and advantage of this sealing contact in the valve in its 'assembled' form are hereinafter described.

Diaphragm valve 52 is made of a resilient material which will withstand contact with the high or low temperature fluids in the water system and is the type of valve described in U.S. Pat. No. 3,495,803. The features of the diaphragm valve will be hereinafter described so as to explain the function of the invention, but reference is made to the aforementioned patent for a more complete description of the construction of the diaphragm valve and the pilot valve pin. Valve 52 has central portion 52a with a central opening through which pilot valve pin 34 exceeds. Central portion 52a also has a plurality of radial openings 52b extending from enlarged portion 52c of the central opening. The function of radial openings 52b and enlarged portion 52c will be hereinafter described. Central portion 52a extends upwardly and sealingly contacts depending annular portion 50b of retainer 50.

Relatively thin connecting portion 52d connects central portion 52a with movable sealing portion 52e which sealingly contacts annular valve seat 42a. Connecting portion 52d allows sealing portion 52e to move away from valve seat 42a to open the valve by means which will be hereinafter described.

To describe the operation of the air vent device, it will first be assumed that it is connected to a functioning water system and that all parts are in the position shown in FIGS. 1 and 3. Sealing portion 52e of the valve 52 is maintained against valve seat 42a by action of air pressure in rear chamber 56. Air enters chamber 56 from pressure chamber 14 through a series of longitudinal or spiral slots 58 in pilot valve pin 34. Thus, when in the position of FIG. 3, pilot valve pin 34 allows air to pass from pressure chamber 14, through the central opening in central portion 52a into enlarged portion 52c. The air passes through radial openings 52b, through depending portion 50b and into chamber 56. Since the air pressures are approximately equal in chambers 14 and 56, the diaphragm valve is maintained closed due to the larger effective area of diaphragm 52 facing chamber 56. Thus, regardless of the air pressure in the chambers, the diaphragm valve 52 will remain closed as long as pilot valve pin 34 is in its lower position.

As the volume of air in chamber 14 increases, it forces the water out of the chamber, thereby lowering float 26. Due to the linkage connecting float 26 to pilot valve pin 34, the pilot valve pin 34 moves upwardly as the float moves downwardly. When float 26 reaches a predetermined position the large diameter of pin 34 engages the middle part of central portion 52a thus cutting off communication between enlarged portion 52c (and consequently, chamber 56) and chamber 14. When the float lowers to another predetermined position, reduced diameter portion 34a of pilot valve pin 34 allows communication between enlarged portion 52c (and, consequently, chamber 56) and vent opening 60, thereby venting the air in chamber 56. Since the air pressure in chamber 14 is now greater than that in chamber 56, sealing portion 52e is moved upwardly to open the valve. Air then escapes from the air vent device through radial openings 42b, around valve seat structure 42 and through vent opening 60. The air may be allowed to vent directly out of opening 60, or a pipe may be connected so as to direct the air to a more suitable venting location.

As the volume of air within the device diminishes, the water level will begin to rise, causing float 26 to rise and pilot valve pin 34 to lower. The pilot valve pin 34 first reaches a position where it cuts off communication between vent opening 60 and enlarged portion 52c. Further rise in the water level causes the pilot valve pin to lower to a position where it again allows air to pass from chamber 14 into chamber 56. The lowering of pilot valve pin 34 to its closed position is made more positive by spiral spring 62 which assists the buoyant force exerted by float 26. The strength of spring 62 should obviously be chosen so as to not prevent float 26 from lowering when the water level drops in chamber 14. As the pressure in chamber 56 becomes relatively equal to that in chamber 14, it moves sealing portion 52e against valve seat 42a, due to the difference in effective areas, and cuts off the venting action.

As described, sealing surface 52e of diaphragm 52 is initially in sealing contact with annular valve seat 42a when the valve is in the 'as assembled' form i.e., not connected to an operating water system. The importance and advantage of this can be described by examining what would happen if this initial sealing condition were not present. During the initial filling of the system, the water level in the system and subsequently in housing chamber 14 will rise. If, however, sealing surface 52e were not in contact with seat 42a, air would vent through outlet 60 and no system pressure would build up. Since, as herein described, operation of the vent is controlled solely by system pressure, the vent would remain open. Water would subsequently fill chamber 14 and discharge through opening 60. Thus the need to have sealing surface 52e initially in contact with seat 42a is obvious.

With sealing member 52e being in initial contact with seat 42a, a valve function results which has significant advantage over prior art devices. Frequently, during the cooldown of water systems, negative system pressures are encountered. In prior art devices, such reduction of system pressure would result in the expansion of the trapped air volume in the device resulting in the lowering of the float. Such would allow the vent to open, with air being drawn into the system. The device herein described, under exactly the same condition of reduced system pressure, will not open. Reduced system pressure (below atmosphere) will allow a small quantity of air to be drawn into chamber 14, thus lowering the float. With the float in such float position, the pilot valve pin will be in position to expose chamber 56 to the atmosphere. This pressure will be higher than the pressure on the other side of the flexible diaphragm member, thus force sealing surface 52e against seat 42a and precluding additional air from being drawn into the system.

Thus, from the foregoing, it can be seen that the venting device according to the invention uses the internal air pressure to both open and close the diaphragm valve, thereby eliminating the serious drawbacks of the prior art devices.

The foregoing specific description is for illustrative purposes only and certain modifications and variations thereto may be undertaken without exceeding the scope of the appended claims.

We claim:

1. A device to automatically vent entrapped air from a water system comprising:

(a) a housing having an inlet connected to said water system to allow passage of water and air into said housing and an air outlet to allow air to escape from said housing;

(b) a cavity in said housing, interposed between said inlet and said air outlet, (c) pilot valve-operated diaphragm valve means comprising a valve seat structure containing an upwardly facing rigid valve seat member having a central aperture communicating with the interior of said housing, a pilot valve-operated flexible diaphragm valve member having a sealing surface which faces downward and sealing engages against said rigid valve seat member, said diaphragm valve member having a central aperture, a chamber located above said flexible diaphragm member, on the side of said flexible diaphragm member opposite said sealing surface, said chamber communicating with said central aperture of said diaphragm valve member, a retaining means to position and retain said flexible diaphragm member in said valve seat structure such that said sealing surface on said flexible diaphragm member is in contact with said rigid valve seat member, said retaining means having a central aperture which is aligned with and communicates with said central aperture of said diaphragm valve member, and a pilot valve pin slidably located in said central aperture of said diapragm valve member, at least one passageway being located in the lower portion of said pilot valve pin, said lower passageway allowing communication between said cavity in said housing and said central aperture in said diaphragm valve member when said diaphragm valve member sealingly engages said valve seat member and not being in such communication position once said lower passageway has moved entirely within said central aperture of said diaphragm valve member or when such sealing engagement does not exist, said pilot valve pin allowing communication between said chamber and said air outlet when said sealing engagement does not exist, at least one passageway or indentation being located in the upper portion of said pilot valve pin, said upper passageway or indentation allowing communication between said chamber and said air oulet once said diaphragm valve member is not in the sealing position, said pilot valve-operated diaphragm valve means selectively opening and closing said air outlet, the air pressure within said housing being used to open and close said diaphragm valve means; and (d) float means within said housing operatively connected to said pilot valve pin, said float means rising and falling as the water level in said housing rises and falls such that when said float means reaches a first predetermined lower position said pilot valve pin no longer allows communication between said chamber and said cavity, when said float means reaches a second predetermined lower position said pilot valve pin causes said diaphragm valve to open and vent air through said air outlet, via a passageway from said central aperture of said rigid valve seat member to said air outlet, said upper passageway or indentation in the upper portion of said pilot valve pin being in a position which allows communication between said chamber and said air outlet, and when said float means reaches a predetermined upper position said pilot valve pin causes said diaphragm valve to close by allowing passage of air from said housing to said chamber located above said diaphragm valve means, which returns to said sealing position, said diaphragm valve member being in sealing engagement with said rigid valve seat member whenever said float means is in its up sealing position or the air pressure in said chamber is equal to or greater than the air pressure in said cavity.

2. The device of claim 1 further comprising float guide means to guide said float along a substantially straight path of travel.

3. The device of claim 2 wherein said pilot valve allows passage of air from said housing to a chamber on one side of said diaphragm valve means to close same when said float means reaches a predetermined upper position, and wherein said passageway in said pilot valve pin is a slot.

4. The device of claim 3 wherein said pilot valve vents said chamber to atmosphere, when said float means reaches a predetermined lower position, thereby allowing the internal air pressure in said housing to open said diaphragm valve means.

5. The device of claim 4 wherein said pilot valve vents said chamber to atmosphere when said float means reaches a predetermined lower position, thereby allowing the internal air pressure in said housing to open said diaphragm valve means.

6. The device of claim 1 wherein said diaphragm valve means is affixed between a retainer and a valve seat structure having a valve seat which is contacted by said diaphragm valve when in its closed position.

7. The device of claim 6 wherein said housing is formed by an upper housing portion and a lower housing portion, said portions being separable, and wherein said valve seat structure is attached to said upper housing portion.

8. The device of claim 7 wherein said valve seat structure is removably attached to said upper housing portion such that when the upper and lower housing portions are separated, the retainer, diaphragm valve, and valve seat structure are removable as a unit from said upper housing portion.

9. The device of claim 8 wherein said valve seat structure is threadingly attached to said retainer.

* * * * *